United States Patent [19]

Esser et al.

[11] Patent Number: 4,475,125
[45] Date of Patent: Oct. 2, 1984

[54] TELEVISION PICK-UP ARRANGEMENT COMPRISING A SOLID-STATE PICTURE PICKUP DEVICE

[75] Inventors: Leonard J. M. Esser; Leendert J. van de Polder, both of Eindhoven, Netherlands

[73] Assignee: U.S. Philips Corporation, New York, N.Y.

[21] Appl. No.: 367,130

[22] Filed: Apr. 9, 1982

[30] Foreign Application Priority Data

Apr. 16, 1981 [NL] Netherlands .......................... 8101887

[51] Int. Cl.³ .......................... H04N 5/14; H04N 3/14
[52] U.S. Cl. ...................................... 358/213; 358/162
[58] Field of Search ................................ 358/162, 213

[56] References Cited

U.S. PATENT DOCUMENTS

| | | | |
|---|---|---|---|
| 3,946,152 | 3/1976 | Illetschko | 358/162 |
| 4,127,877 | 11/1978 | Morishita | 358/162 |
| 4,160,265 | 7/1979 | Tanaka | 358/162 |
| 4,200,887 | 4/1980 | van den Avoort | 358/162 |
| 4,336,552 | 6/1982 | Tanaka | 358/162 |

*Primary Examiner*—Michael A. Masinick
*Attorney, Agent, or Firm*—Thomas A. Briody; William J. Streeter; Charles E. Quarton

[57] ABSTRACT

A television pick-up arrangement comprising a solid-state picture pick-up device rows of picture pick-up elements of which are connectable to parallel inputs of two output shift registers. When the shift registers are read simultaneously they supply at their series outputs picture signal which are associated with each time two pairs of rows of picture pick-up elements. According to the invention, the two picture signals are applied on the one hand separately to a vertical aperture correction circuit having only one delay device with a time delay of one line period and on the other hand combined to a horizontal aperture correction circuit, the corrected signals being combined behind said correction circuits. Advantageous use can then be made of a device in which pick-up information is obtained by both holes and electrons which are caused by photons.

6 Claims, 2 Drawing Figures

TELEVISION PICK-UP ARRANGEMENT COMPRISING A SOLID-STATE PICTURE PICKUP DEVICE

BACKGROUND OF THE INVENTION

The invention relates to a television pick-up arrangement comprising a solid-state picture pick-up device provided with a bi-dimensional pattern of picture pick-up elements arranged in rows and columns in a semiconductor body and also comprising two output shift registers of the parallel-in, series-out type, parallel inputs of the two output shift registers being coupled to rows of picture pick-up elements and the series outputs being coupled to inputs of a superposition circuit having an output for supplying a superposition signal at a simultaneous readout of the output shift registers.

Such an arrangement is described in U.S. patent application Ser. No. 365,709 filed Apr. 5, 1982. Herein, the pick-up information associated with a row of picture pick-up elements obtained after an information integration period is stored in one of the output shift registers. After having been adjusted to the initial reference state, the same row of picture pick-up elements is immediately read again and the zero information then present (the information period is so small as to be neglected) is stored in the other output shift register. Subsequent thereto the registers are serially read simultaneously and the information is applied to the superposition circuit in the form of a subtracting stage. The zero information with only signal disturbances, as caused by, for example, clock pulse signals is subtracted from the pick-up information containing the same signal disturbances, so that the output of the superposition circuit produces a signal having only the pick-up information.

SUMMARY OF THE INVENTION

The invention uses a pick-up arrangement of this type having a solid-state picture pick-up device and two output shift registers coupled thereto for a different purpose than the described noise signal compensation, this being a contour signal correction, and in particular a horizontal and a vertical aperture signal correction. Such a correction, which can be performed in a simple way in the arrangement, results in a sharper display of contours in the displayed picture which correspond to signal transitions in the picture signal, thus improving the picture quality. According to the invention, a television pick-up arrangement is characterized in that on reading the output shift registers said registers supply as picture signals pick-up information associated with pairs of adjacent rows of picture pick-up elements, the output of the said superposition circuit which has a superposition signal the picture signals which are combined with the same polarity being coupled to an input of a horizontal aperture correction circuit and the outputs of the two output shift registers each being coupled to an input of a vertical aperture correction circuit, an output of the respective horizontal and vertical aperture correction circuit for carrying a horizontal and a vertical aperture-corrected picture signal, respectively being coupled to an input of a second superposition circuit which has an output for carrying the horizontal and vertical aperture-corrected picture signal.

A television pick-up arrangement in accordance with the invention having a simpler construction of the vertical aperture correction circuit compared with prior art arrangements is characterized in that the vertical aperture correction circuit comprises only one signal delay device having a time delay equal to one television line period, the input of the signal delay device being coupled to the output of that output shift register which during reading in a preceding line period is associated with the adjacent row of picture elements with respect to the said pair of adjacent rows of picture elements, the output of the last-mentioned output shift register and the output of the signal delay device each being coupled to an input of a third superposition circuit which has an output, the output of the third superposition circuit and the output of the output shift register other than the last-mentioned output shift register each being coupled via an amplifier circuit to an input of a fourth superposition circuit which has an output for carrying the vertical aperture corrected picture signal.

A television pick-up device in accordance with the invention wherein the aperture correction is performed on both signal components, which results in an optimum improvement of the picture quality, is characterized in that a low-pass and a high-pass filter, respectively is arranged in series with the vertical and horizontal aperture correction circuit, respectively, these filters being complementary.

A television pick-up arrangement in accordance with the invention in which an optimum contour correction is possible owing to a dense packing of the picture pickup elements in the semiconductor body, is characterized in that the solid-state picture pick-up device is in the form of a type in which the rows of picture pick-up elements are alternately sequentially active for picture information recording by means of picture information integration, caused by photons, by simultaneously electrons and holes in the semiconductor body.

This results in an improved picture quality in the vertical direction on display by means of a television pick-up arrangement which is characterized in that in each pair of adjacent rows of picture pick-up elements the picture pick-up elements in one row are shifted in the row direction to the intermediate position relative to the picture pick-up elements in the other row.

A television pick-up arrangement in accordance with the invention has the additional advantage that it may be of such a structure that it is integrated, at least predominantly, in a semi-conductor body.

BRIEF DESCRIPTION OF THE DRAWING

The invention will now be further described by way of example with reference to the accompanying drawing in which.

DESCRIPTION OF THE PREFERRED EMBODIMENT

Figure 1:
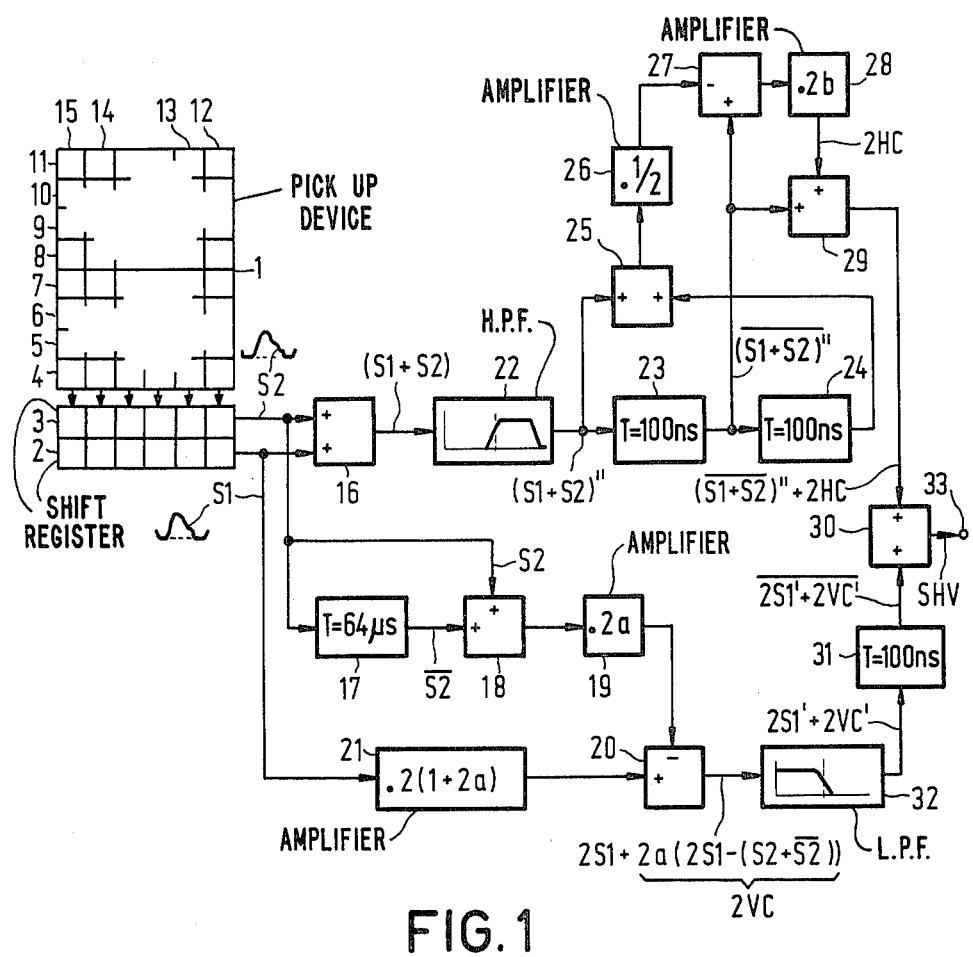
FIG. 1 is a block schematic circuit diagram of a construction of a television pick-up arrangement in accordance with the invention.

In the television pick-up arrangement shown in FIG. 1 reference numeral 1 denotes a solid-state picture pick-up device and 2 and 3 denote two parallel-in, series-out output shift registers connected thereto. With the exception of a construction of device 1 which will be described with reference to FIG. 2 and which may be advantageously used, the specific construction of the device 1 of FIG. 1 is not essential for the invention. The device 1 shown in FIG. 1 may, for example, be in the form of a system of cross-bars or a charge transfer device. The only important fact is that the information about a recorded scene present in rows designated 4 to 11, inclusive of picture pick-up and storage elements, respectively of the device 1 is present, one after the other, with pairs of rows with the row sequence (4, 5), (6, 7), (8, 9) and (10, 11) etc., in the parallel-in, series-out output shift registers 2 and 3. When the registers 2 and 3 are read, the information coming from picture pick-up and picture storage elements, respectively, which information is present in columns denoted by reference numerals 12 to 15, inclusive become available, one after the other, at the register outputs. The first picture pick-up and picture storage elements, respectively are located in the rows 4 to 11, inclusive in the column 12, the last one of each row being located in the column 15. The first element in the row 4 which is located in the column 12 corresponds with the beginning of the line and field-sequential scanning, customary in television, or for example, a display screen. Usually, when interlace is performed once in every two field periods, said scanning operation starts in the left top corner of the display screen, so that in the described construction of the device 1 the information present in the left top corner in a scene to be televized is processed in the right bottom portion (column 12, row 4) in the device 1. For this purpose an inverting lens, not shown, may be arranged between the scene and the device 1. FIG. 1 shows some rows and columns of picture pick-up elements which in practice will amount to some hundreds of rows and columns, resulting in some hundreds of thousands of elements arranged in rows and columns.

In addition, it is possible to read the device 1 and to apply the information to the registers 2 and 3 in accordance with the known "inter line" or "frame transfer" method. The elements of the device 1 are then divided into picture pick-up elements (for example the "frame transfer" rows 8 to 11, inclusive) and storage elements (rows 4 to 7, inclusive), the storage elements being read, while the scene information is recorded in the picture pick-up elements. After all the storage elements have been read in one read period, the information is transferred from the picture pick-up elements in a comparatively short period of time to associated storage elements. Which type of read method is used is irrelevant for the invention. It is only essential that when reading the output shift registers 2 and 3 these shift registers contain the pick-up information which is picked up via the parallel inputs and is associated with each pair of adjacent rows of picture pick-up elements, for example in the sequence (4, 5) (6, 7) (8, 9) (10, 11). The pick-up information becomes available at the outputs of the registers 2 and 3 in the form of picture signals S1 and S2, shown in FIG. 1. Compensation circuits may be connected to the outputs of the registers 2 and 3 to compensate for possible differences in pick-up sensitivity or for any phase shift between the signals S1 and S2 with respect to the original positional dependence of the information. The signals S1 and S2 are shown in FIG. 1 with the same polarity and are each applied to a (+) input of a superposition circuit 16 the output of which carries as a result thereof a signal (S1+S2) as a superposition signal.

The possibility to have always at one's disposal two picture signals S1 and S2 which are sequentially associated with always two adjacent rows (4, 5), (6, 7) etc., of picture pick-up elements renders it possible to perform a simple and cheap vertical aperture correction. This correction requires only one signal delay device, denoted by 17 and having a time delay equal to one television line period T, for which it holds, for example, that $T = 64$ μs. The input of the delay device 17 is connected to the output of the output shift register 3, the output of the delay device 17 which carries a picture signal $\overline{S2}$ delayed by one line period, being connected to a (+) input of a superposition circuit 18. A further (+) input of the circuit 18 is connected to the output of the register 3. The circuit 18 has an output which, via an amplifier circuit 19 having a gain factor 2a is connected to a (−) input of a superposition circuit 20. A (+) input of the circuit 20 is connected to the output of an amplifier circuit 21 the input of which is connected to the output of the shift register 2. The circuit 21 has a gain factor $2(1+2a)$, the output of the circuit 20 carrying a signal equal to $2S1+2a(2S1-(S2+\overline{S2}))=2S1+2VC$, wherein VC is a vertical aperture correction signal and $S1+VC$ a vertical-aperture corrected picture signal which is thus produced by a vertical aperture correction circuit (17–21). Compared with prior art arrangements employing a vertical aperture correction, such as, for example, the arrangement disclosed in U.S. Pat. No. Re29570, the present arrangement has the advantage that only one delay device (17) having a time delay of one line period is required. It is then necessary that the signal S2 is applied to the delay device 17 and to the superposition circuit 18, since for the vertical aperture correction of a picture signal occurring in a certain line period information of a subjacent and a superjacent line in the television picture is used, so that when the information coming from, for example, the rows 6 and 7 of picture pick-up elements is read from the respective shift registers 2 and 3 the information originating the preceding row 5 of picture pick-up elements must be available. When reading the registers 2 and 3, information originating the rows 8 and 9 then becoming available, the delay device 17 supplies the information originating the preceding row 7 of picture pick-up elements.

The superposition signal S1+S2 supplied by the superposition circuit 16 can be advantageously utilized when performing a horizontal aperture correction. For that purpose the signal S1+S2 is applied to a horizontal aperture correction circuit (23–29), still to be described, via a high-pass filter 22. The filter 22 applies a signal (S1+S2)″ to two series-arranged signal delay devices 23 and 24 and to a (+) input of a superposition circuit 25 a further (+) input of which is connected to the output of the device 24. The devices 23 and 24 have a time delay $T=100$ ns, which time delay, which is given here by way of example, is associated with the picture element scanning period. Via an amplifier circuit 26 having a gain factor equal to ½ the output of the circuit 25 is connected to a (−) input of a superposition circuit 27 a (+) input of which is connected to the output of the device 23. Via an amplifier circuit 28 having a gain factor 2b the output of the circuit 27 is connected to a (+) input of a superposition circuit 29 a further (+) input of which is connected to the output of the device 23. In circuit 29 a delayed signal $\overline{(S1+S2)}''$, supplied by the device 23 is combined with a horizontal aperture correction signal 2HC supplied by the circuit 28, which results in a horizontal aperture corrected signal $\overline{(S1+S2)}''+2HC$ at the output of the circuit 29.

The output of the circuit 29 is connected to a (+) input of a superposition circuit 30. A further (+) input of the circuit 30 is connected to the output of a signal delay device 31 having a time delay equal to T=100 ns. The input of the device 31 is connected to the output of a low-pass filter 32 the input of which is connected to the output of the circuit 20. The filter characteristics of the high-pass filter 22 and of the lowpass filter 32 are complementary, it being assumed that the same time delay is present. As a result thereof the output of the filter 32 carries a signal 2S1'+2VC' which is associated with the signal (S1+S2)'' supplied by the filter 22. The device 31 is provided to compensate for the delay of the device 23 so that a signal $\overline{2S1'+2VC'}$ produced by the device 31 is associated with the signal $\overline{(S1+S2)}''+2HC$, the first-mentioned signal being a low frequency, vertical aperture-corrected picture signal and the last-mentioned signal being an associated high-frequency, horizontal aperture-corrected picture signal. At the output of the circuit 30 the two above-mentioned signals result in a contour-corrected picture signal SHV, that is to say a vertical and horizontal aperture-corrected signal, which becomes available at an output terminal 33 for further processing in a television camera. The use of the complementary filters 32 and 22 causes the vertical and horizontal aperture correction which has a low and high-frequency character, respectively, to be performed on low and high-frequency picture signal components, respectively, which results in an optimum improvement of the picture quality.

Figure 2:
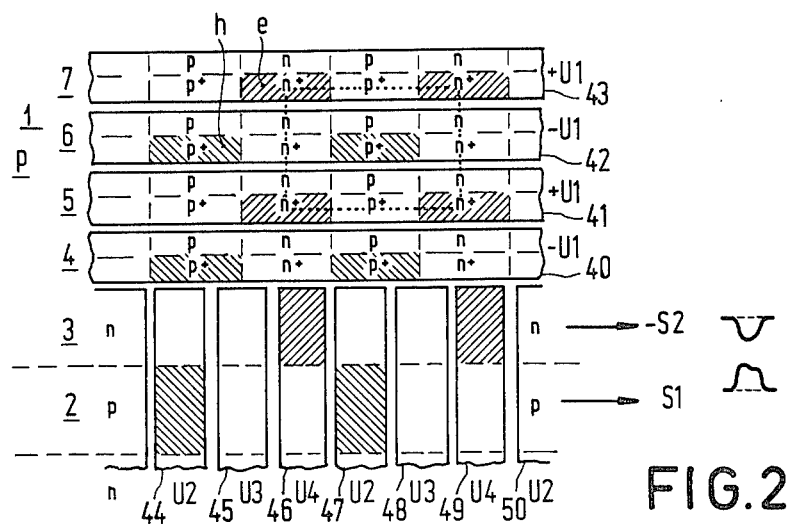
FIG. 2 is an elevational view of a solid-state picture pick-up device which may be advantageously employed in a pick-up arrangement in accordance with the invention.

FIG. 2 is an elevational view of a construction of the device 1 which can be advantageously used in an arrangement in accordance with the invention as shown in FIG. 1. Only those components which are useful to explain the advantage are shown schematically in FIG. 2. For a detailed description of the construction of the device 1 and the output shift registers 2 and 3, which may be integrated together in a semiconductor body reference is made to the cited U.S. patent application Ser. No. 365,709.

The components which are designated in FIG. 1 by the reference numerals 1 to 7, inclusive are shown in an elevational view in FIG. 2. In a p-type semiconductor body there are formed in the column direction continuous regions of n-type semiconductor material which connect in a comb-shaped manner to a region of n-type semiconductor material provided at the register 3. In the regions of the n-type semiconductor material located in the column direction and the intermediate regions of p-type semiconductor material regions of a higher doped semiconductor material are formed which are denoted by $n^+$ and $p^+$. The register 2 is in the form of a region of p-type semiconductor material of the body along which n-type regions are located. Electrically conductive conductors, which are insulated from the body, are provided on the regions shown in the semiconductor body, the reference numerals 40 to 50, inclusive designating some of these conductors. Underlying the transparent conductors 40, 41, 42 and 43 are the respective rows 4, 5, 6 and 7 of picture pick-up elements. For the operation of the device 1 it holds that depending on whether a negative voltage $-U1$ (conductors 40 and 42) is applied to a conductor or a positive voltage $+U1$ (conductors 41 and 43) a charge accumulation occurs in a region $p^+$ and $n^+$, respectively caused by holes h and electrons e, respectively. A hole h and an electron e are produced by a photon of the light incident on the semiconductor body and coming from a scene to be televized. The hole h and electron e, respectively, produced by the photon, is pulled by the voltages $-U1$ and $+U2$ to the (hatched) higher doped region $p^+$ and $n^+$, respectively and retained there. Compared with prior art pick-up devices it is here remarkable that each photon results in a hole h and an electron e which now as a rule both furnish an information contribution and not only one of them. This enables a denser packing of the picture pick-up elements. By way of example, FIG. 2 shows by means of a dotted line a picture pick-up element around a higher doped region ($p^+$).

After a predetermined light integration period, the registers 2 and 3 having been completely emptied, a charge transfer from the elements of the rows 7, 6 and 5 to the rows 6, 5 and 4 may be performed by changing the polarity of the voltage U1, the elements of the row 4 transferring their own charge to the hatched areas in the register 2, it being possible that for a shift from the row 4 the voltage on the conductor 40 may exceed $+U1$. Thereafter the charges coming from row 5 are shifted from under the conductor 40 to the hatched areas in the register 3. Thereafter, by way of example, clock pulse voltages U2, U3 and U4 are applied to the respective conductors (44, 47), (45, 48) and (46, 49) in a three-phase structure. The charges in the hatched p regions are shifted first in the register 2 (from under conductors 44 and 47 to conductors 45 and 48) and thereafter the charges in the hatched n regions (from under conductors 46 and 49 to conductors 47 and 50). This cycle is repeated and the result is that at the output of register 2, which output is not shown in FIG. 2, the signal S1 of the drawing becomes available and that at the output of the register 3, of the opposite polarity, the signal $-S2$ shown in the drawing occurs. For a detailed description of the read-out mechanism which may also be performed in a different phase structure reference is made to the cited U.S. patent application Ser. No. 365,709.

With reference to FIG. 2 it was described that the conductors 40, 41, 42 and 43 are transparent, so that the elements in the rows 4, 5, 6 and 7 act as picture pick-up elements. If the "frame transfer" read method were used, a light-impermeable layer may be provided over the rows 4, 5, 6 and 7, rows 8, 9, 10 and 11, which are shown in FIG. 1 but not in FIG. 2 with picture pick-up elements being active.

The use of the embodiment of the device 1 shown in FIG. 2 is advantageous for the horizontal aperture correction described with reference to FIG. 1. Combining the signals S1 and S2 with the same polarity in the superposition circuit 16 results in the information from the $p^+$ regions in one row (4, 6 etc) as well as the information from the $n^+$ regions in the other row (5, 7 etc). being present in the signal (S1+S2). As in every pair of adjacent rows (4, 5) (6,7) etc. of picture pick-up elements these picture pick-up elements are shifted in one row in the row direction to the intermediate position relative to the picture pick-up elements in the other row, the horizontal resolution is improved by a factor of two as a result of the addition, which is advantageous for the horizontal aperture correction which results in a picture quality which is improved in the row direction.

The embodiment of a television pick-up arrangement in accordance with the invention shown in FIG. 1 is suitable for implementation in integrated form in a semiconductor body, which is an advantage. Clock pulse circuits not shown, may then also be integrated in the semiconductor body, shift signals being applied to the device 1, the output shift registers 2 and 3 and the delay devices 17, 23, 24 and 31, which are also in the form of analogue shift registers. For further circuits, not shown, sampleand hold signals may be derived from the clock pulse signals.

What is claimed is:

1. A television pick-up arrangement comprising a solid-state picture pick-up device provided with a bi-dimensional pattern of picture pick-up elements arranged in rows and columns in a semiconductor body and also comprising first and second output shift registers of the parallel-in, series-out type, parallel inputs of the two output shift registers being coupled to rows of picture pick-up elements and the series outputs being coupled to inputs of a superposition circuit having an output for supplying a superposition signal at a simultaneous read-out of the output shift registers, characterized in that on reading the output shift registers said registers supply picture signals having pick-up element information associated with pairs of adjacent rows of picture pick-up elements, the output of the said superposition circuit which has a superposition signal the picture signals which are combined with the same polarity being coupled to an input of a horizontal aperture correction circuit and the outputs of the two output shift registers each being coupled to an input of a vertical aperture correction circuit, an output of the respective horizontal and vertical aperture correction circuit for carrying a horizontal and a vertical aperture corrected picture signal, respectively being coupled to an input second superposition circuit which has an output for carrying the horizontal and vertical aperture-corrected picture signal.

2. A television pick-up arrangement as claimed in claim 1, characterized in that the vertical aperture correction circuit comprises only one signal delay device having a time delay equal to one television line period, the input of the signal delay device being coupled to the output of the first output shift register which during reading in a preceding line period is associated with the adjacent row of picture elements with respect to the said pair of adjacent rows of picture elements, the output of the first output shift register and the output of the signal delay device each being coupled to an input of a third superposition circuit which has an output, the output of the third superposition circuit and the output of the second output shift register each being coupled via an amplifier circuit to an input of a fourth superposition circuit which has an output for carrying the vertical aperture-corrected picture signal.

3. A television pick-up arrangement as claimed in claim 1 or 2, characterized in that a low-pass and a high-pass filter, respectively are arranged in series with the vertical and the horizontal aperture correction circuit, respectively, these filters being complementary.

4. A television pick-up arrangement as claimed in claim 1 or 2, characterized in that the solid-state picture pick-up device includes rows of picture pick-up elements alternately sequentially active for picture information recording by means of picture information integration caused by photons simultaneously generating electrons and holes in the semiconductor body.

5. A television pick-up arrangement as claimed in claim 4, characterized in that in each pair of adjacent rows of picture pick-up elements, the picture pick-up elements in one row are shifted in the row direction to an intermediate position relative to the picture pick-up elements in the other row.

6. A television pick-up arrangement as claimed in claim 5, comprising a structure that is integrated at least predominantly in a semiconductor body.

* * * * *